Dec. 26, 1967   A. N. FRIEDMAN ET AL   3,360,770
VIBRATION SENSOR
Filed Sept. 26, 1966   2 Sheets-Sheet 1
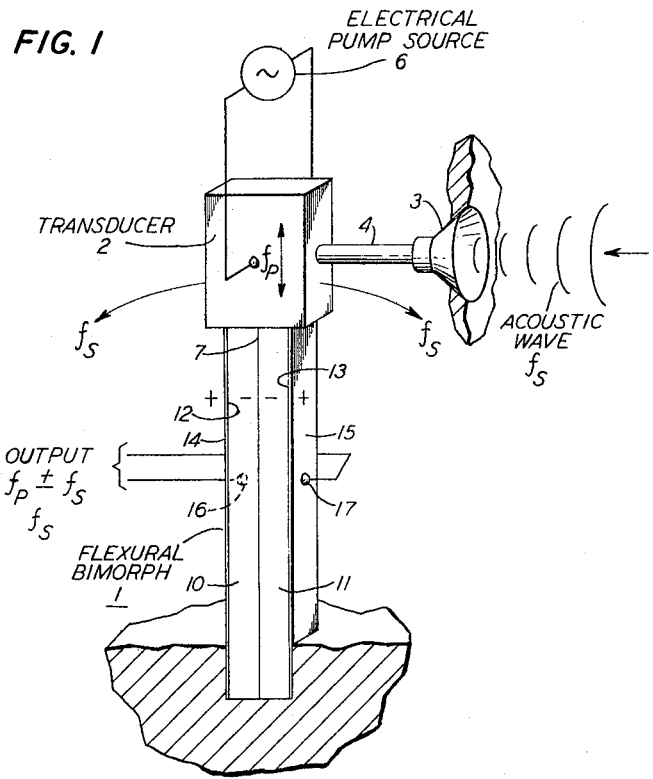
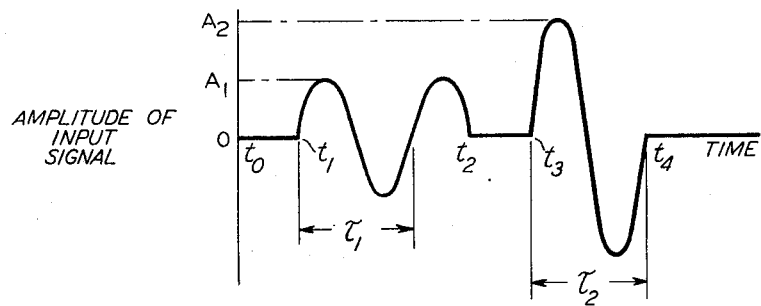
INVENTORS: A. N. FRIEDMAN
D. L. WHITE
BY
*Sylvan Sherman*
ATTORNEY 3,360,770
VIBRATION SENSOR
Allen N. Friedman, Fair Lawn, and Donald L. White, Mendham, N.J., assignors to Bell Telephone Laboratories, Incorporated, Berkeley Heights, N.J., a corporation of New York
Filed Sept. 26, 1966, Ser. No. 582,099
6 Claims. (Cl. 340—10)

ABSTRACT OF THE DISCLOSURE

The vibration sensor described herein utilizes the principles of parametric amplification. In accordance with the invention, the incident vibrational signal is mechanically coupled to a balanced, mechanical reactive bridge in a manner to unbalance the bridge with respect to a locally applied, high frequency mechanical pumping signal. The result of introducing an imbalance in the bridge circuit is to produce a double-sideband, suppressed carrier electrical output signal.

Figure 3:
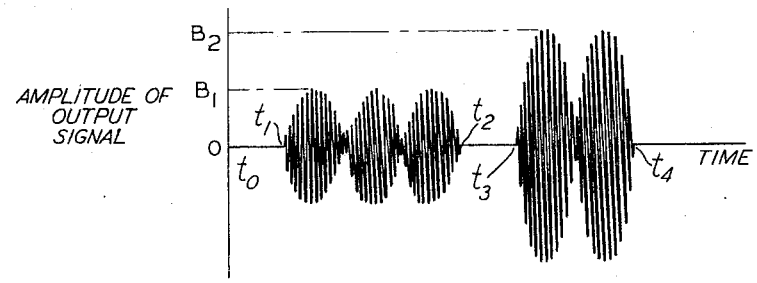

In the specific embodiments described, the reactive bridge is a piezoelectric flexural bimorph.

---

This invention relates to vibration sensors and, in particular, to low frequency vibration sensors of the type used in underwater sound detection equipment.

The typical sound detector presently employed comprises a diaphragm which directly actuates a piezoelectric transducer. The latter, in turn, develops an electrical output which is coupled into an electronic amplifier. It is a characteristic of such a detection system that the signal-to-noise ratio varies as a third or fourth power of the frequency, resulting in extremely poor low frequency performance.

To compensate for this poor low frequency performance, the practice is to increase the size of the diaphragm so as to capture more of the incident signal energy and, thereby, to increase the signal-to-noise ratio. The result of this practice, however, is to degrade the high frequency performance of the system.

This limitation in the performance of the "piezoelectric-electronic amplifier" type of sound detector is fundamental and cannot be improved beyond whatever improvement can be obtained by selecting the best transducer and amplifier.

The present invention avoids the inherent limitation in prior art vibration sensing devices by the application of the principles of parametric amplification. In accordance with the present invention, the incident vibrational signal is mechanically coupled to a balanced, mechanical reactive bridge in a manner to unbalance the bridge with respect to a locally applied, high frequency mechanical pumping wave. The effect of introducing an imbalance in the bridge circuit is to produce a double sideband, suppressed carrier electrical output signal.

In the various specific embodiments of the invention to be described in greater detail hereinbelow, the reactive bridge is a piezoelectric flexural bimorph, comprising two abutting bars of oppositely polarized piezoelectric material. It is a property of a bimorph that in compression (or tension) it is balanced, producing no electrical output. However, when a lateral force, representing an acoustic signal, is applied to the system, the bimorph is bent, unbalancing it. This causes an electrical signal to appear across the bimorph at the sum and difference frequencies of the compression wave and the lateral force.

It is an advantage of the present invention that the frequency conversion thus produced introduces at the very input to the detection system a power gain that is proportional to the square of the ratio of the pump frequency to the signal frequency. Since the frequency ratio can be of the order of 100 to 1 or greater, available gain of the order of 40 decibels can be realized. Furthermore, this available gain increases as the frequency decreases, in contradistinction to prior art sound detectors which are characterized by signal-to-noise ratios which decrease with decreasing frequency.

It is an interesting aspect of the invention that nonlinear (parametric) interaction is produced by mechanical components that appear, at first glance, to be inherently linear elements. This seeming paradox, however, is resolved by the realization that an elastic member of finite length, having freedom to move in two or more dimensions is, in fact, nonlinear.

Figure 4:
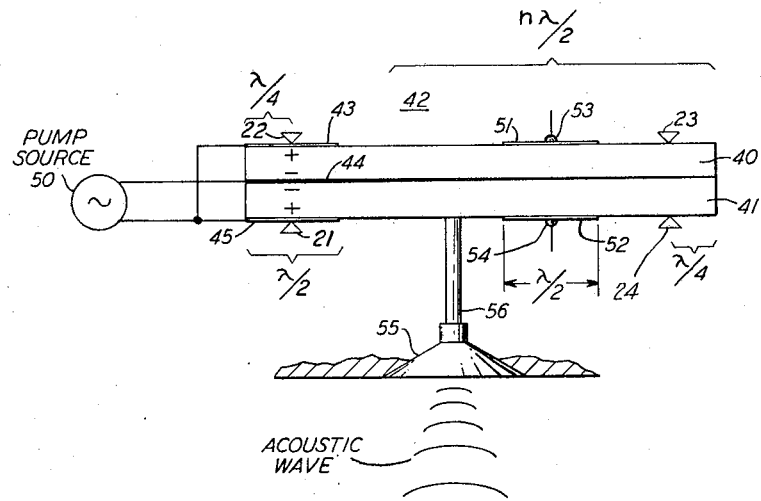

These and other advantages, the nature of the present invention, and its various features, will appear more fully upon consideration of the various illustrative embodiments now to be described in detail in connection with the accompanying drawings, in which:

FIG. 1 is an illustrative embodiment of a vibration sensor in accordance with the present invention;

FIGS. 2 and 3, included for purposes of explanation, show an input signal and the resulting high frequency output signal obtained from a vibration sensor in accordance with the invention; and FIG. 4 is a second illustrative embodiment of a bimorph for use in a vibration sensor in accordance with the invention.

Referring to the drawings, FIG. 1 shows a first embodiment of the invention comprising a piezoelectric flexural bimorth 1, an electromechanical transducer 2 located at one end of the bimorph for inducing longitudinal (compression) waves therein, and a mechanical wave antenna 3. An electrical energy source 6 is connected to transducer 2 and provides the so-called "pump" energy at a frequency $f_p$. Antenna 3, comprising a vibrating member, is mechanically coupled to transducer 2 by means of a mechanical link 4, such as a bar or wire.

The bimorph 1, which is sold commercially, comprises a pair of abutting bars 10 and 11 of a piezoelectric material, such as quartz. The bars are disposed such that surfaces of like polarization are in contact, forming a planar interface 7. The outer surfaces 12 and 13 of the bars are metallically coated, forming electrodes 14 and 15, respectively, to which a pair of output terminals 16 and 17 connect.

The present invention operates upon the principle that a bimorph in compression (or tension) is balanced, producing no electrical output. This comes about because the polarizations of bars 10 and 11 are series-opposing so that any voltage developed between the inner and opposite outer surfaces of one of the bars, when compressed or elongated, is equal in amplitude and opposite in polarity to the voltage developed between the inner and opposite outer surfaces of the other bar. This is indicated by the + and − signs on the respective bars. Thus, a longitudinal wave induced in the bimorph when transducer 2 is electrically energized, result in no net output voltage across output terminals 16 and 17.

If, however, the system is unbalanced by bending the bimorph, the voltages across the two bars are no longer equal, and modulated pump signal is observed at the output terminals 16 and 17. The electrical output is a parametrically amplified signal.

The operation of the specific embodiment shown in FIG. 1 can now be examined in greater detail. As shown, pump energy is supplied to pump transducer 2 at a frequency $f_p$. The transducer, which advantageously is a piece of piezoelectric material cut to be a longitudinal bar resonator at the pump frequency, induces longitudinal waves in the bimorph in a direction parallel to the planar interface 7 defined by the abutting surfaces of the two bars. In the absence of any other signals, the system is balanced and no net signal is produced across the output terminals. However, if now antenna 3 is simultaneously set in motion by means of an acoustic signal wave at a frequency $f_s$, this disturbance is communicated to the bimorph by the mechanical coupler 4. The latter applies a force to the bimorph that is advantageously perpendicular to the planar interface, causing the bimorph to bend back and forth at a rate $f_s$. This unbalances the system by putting one bar of the bimorph in compression while, at the same time, placing the other bar under tension. The voltages developed across the bar as a consequence of this motion add constructively, and a net output voltage appears across the output terminals 16 and 17.

The amplitude of the output signal produced across the bimorph and its duration are a function of the amplitude and duration of the acoustic signal wave. To illustrate, FIG. 2 shows a particular input signal consisting of one and a half cycles of a sinusoidal wave of period $\tau_1$ and maximum amplitude $A_1$, followed by an off period from time $t_2$ to $t_3$, and one cycle of a second sinusoidal wave of period $\tau_2$ and maximum amplitude $A_2$. FIG. 3 shows the variations in the amplitude of the high frequency part of the output signal during the corresponding time intervals. For example, during the period $t_0$ to $t_1$ the signal amplitude is zero and, hence, there is no output. At time $t_1$ the signal amplitude begins to increase, reaching a maximum $A_1$ at time $t_1+\tau_1/4$. Correspondingly, the output signal increases and reaches a maximum $B_1$. A quarter of a cycle later, as the input signal passes through zero amplitude, the output also decreases to zero amplitude. During the second half cycle of the input signal, the bimorph is bent in the opposite direction, again causing an output signal to be produced that is 180 degrees out of phase with that produced during the first half cycle of the signal wave. The correspondence between the acoustic signal wave and the amplitude and duration of the output signal can readily be seen from FIGS. 2 and 3.

From the above description it is seen that any vibrational signal impinging upon antenna 3 causes the bimorph to bend, and produces an output signal, the high frequency part of which is proportional to $F(t) \sin 2\pi f_p t$. It will be noted that this is exactly the form of a suppressed carrier double sideband signal, where the modulation, $F(t)$, is proportional to the acoustic signal wave applied to antenna 3 expressed as a function of time.

From the Manley-Rowe relationships, the available gain produced by the above-described system is proportional to $$(\omega_p/\omega_s)$$

where $\omega_p$ is the angular pump frequency, and
$\omega_s$ the angular signal frequency.

Thus, the bimorph has operated as a mechanical parametric converter capable of producing large power gain at low frequency.

In the embodiment of FIG. 1, the bimorph 1 is energized by means of a separate pump transducer 2 located at one end, and is physically supported at its other end. FIG. 4 illustrates a more efficient arrangement in which the length of the bimorph is an integral number of half wavelengths at the pumping frequency, and in which a portion of the bimorph itself is adapted to operate as the pump transducer. As a result of these modifications, and the manner in which the structure is supported, the bimorph is resonant at the pump frequency, and energy loss to the mount is eliminated.

The transducer portion of the bimorph shown in FIG. 4 occupies a portion at one end of the two piezoelectric bars 40 and 41 comprising the bimorph 42. The optimum size of this portion is a half wavelength at the pump frequency, but it can be any length other than an integral number of wavelengths. Electrical pump energy is coupled into the system by means of electrodes 43 and 45 located on the outer surfaces of bars 40 and 41, respectively, and electrode 44 located between the two bars. Because the bars have opposite polarization, the two outer electrodes 43 and 45 are connected in parallel to one terminal of the pump source 50, whereas the inner electrode 44 is connected to the other terminal of the pump source.

The remaining portion of the bimorph is similar in structure to the bimorph described in connection with FIG. 1. The opposite outer surfaces of bars 40 and 41 are metallically coated to form a pair of electrodes 51 and 52, respectively, to which a pair of output terminals 53 and 54 connect. Optimally, the metallic coating extends over half a wavelength and is centered at a nodal point.

The bimorph in FIG. 4 is supported by means of four knife edges 21, 22, 23 and 24, located at nodal points along the bars. These occur at distances from the bar ends equal to approximately odd multiples of one-quarter of the pump wavelength.

The acoustic wave signal is coupled into the system by means of a mechanical wave antenna 55 which is connected to the bimorph at a nodal point between the knife edge supports by means of a mechanical link 56. In all other respects, the vibration sensor shown in FIG. 4 operates in the same manner as does the vibration sensor shown in FIG. 1.

It is understood that the above-described arrangements are simply illustrative of two of the many possible specific embodiments which can represent applications of the principles of the invention. For example, one of a number of embodiments of the present invention that have been constructed was intended for use as a medical stethoscope. It comprised a "PZT" bimorph and a pump transducer made of PZT-4 material. Both the bimorph and the PZT-4 material are marketed by the Piezoelectric Division of the Clevite Corporation. The mechanical antenna was a rubber diaphragm which was mechanically coupled to the bimorph by means of a fluid (oil) filled chamber. Thus, numerous and varied arrangements can readily be devised in accordance with these principles by those skilled in the art without departing from the spirit and scope of the invention.

What is claimed is:

1. In combination;
   a flexural bimorph comprising two abutting piezoelectric members, defining therebetween a planar interface;
   means for inducing a compression wave within said bimorph in a direction parallel to said interface;
   means for bending said bimorph;
   and means connected across said bimorph for extracting an electrical signal therefrom.

2. The combination according to claim 1 wherein said means for inducing a compression wave comprises a separate electromechanical transducer located at one end of said bimorph.

3. The combination according to claim 1 wherein said means for inducing a compression wave is an integral portion of said bimorph.

4. The combination according to claim 1 wherein the length of said bimorph is an integral number of half wavelengths of said compression wave, and wherein means for supporting said bimorph are located at nodal points.

5. A vibration sensor comprising; an elongated bimorph element;
   means located at one end of said element for inducing compression waves therein;
   means located along said element for bending said element comprising a mechanical antenna and a mechanical link for coupling said antenna to said element;

and electrical contacts connected to the two opposite outer surfaces of said bimorph for extracting electrical signals therefrom.

6. The sensor according to claim 5 wherein said electrical signals are amplitude modulated alternating current signals.

References Cited

UNITED STATES PATENTS

| 1,802,782 | 4/1931 | Sawyer | 340—10 |
| 2,943,279 | 6/1960 | Mattiat | 333—72 |

RODNEY D. BENNETT, *Primary Examiner.*

B. L. RIBANDO, *Assistant Examiner.*